(12) United States Patent
Benson

(10) Patent No.: US 8,517,298 B1
(45) Date of Patent: Aug. 27, 2013

(54) FISHING REEL TECHNOLOGY

(76) Inventor: Bryan Benson, Chappells, SC (US)

( * ) Notice: Subject to any disclaimer, the term of this patent is extended or adjusted under 35 U.S.C. 154(b) by 0 days.

(21) Appl. No.: 13/338,057

(22) Filed: Dec. 27, 2011

Related U.S. Application Data

(60) Provisional application No. 61/427,285, filed on Dec. 27, 2010.

(51) Int. Cl.
*A01K 89/01* (2006.01)

(52) U.S. Cl.
USPC ............................ 242/255; 242/249; 242/257

(58) Field of Classification Search
USPC .................. 242/249, 255, 257, 261, 262, 263
See application file for complete search history.

(56) References Cited

U.S. PATENT DOCUMENTS

| | | | | |
|---|---|---|---|---|
| 2,327,431 A * | 8/1943 | Jicha | ............................ | 242/313 |
| 2,517,776 A * | 8/1950 | Feierabend | .................... | 242/255 |
| 2,836,995 A * | 6/1958 | Heddy | ............................ | 475/12 |
| 4,049,217 A * | 9/1977 | Koopman | ..................... | 242/249 |
| 4,515,324 A * | 5/1985 | Barton | ......................... | 242/250 |
| 4,598,878 A * | 7/1986 | Steffan | ......................... | 242/250 |
| 5,275,352 A * | 1/1994 | Sato | .............................. | 242/261 |
| 6,189,822 B1 * | 2/2001 | Ikuta | ............................. | 242/296 |
| 6,505,787 B1 * | 1/2003 | Nilsen | .......................... | 242/255 |
| 6,561,448 B2 * | 5/2003 | Barker | ......................... | 242/229 |
| 2002/0027177 A1* | 3/2002 | Barker | ......................... | 242/249 |
| 2003/0038200 A1* | 2/2003 | Chiba | .......................... | 242/249 |
| 2009/0194626 A1* | 8/2009 | Gray et al. | .................... | 242/249 |

OTHER PUBLICATIONS

Shimano CITICA 200D/200DPV Instruction Guide.

\* cited by examiner

*Primary Examiner* — Emmanuel M Marcelo
(74) *Attorney, Agent, or Firm* — Skinner and Associates

(57) ABSTRACT

A fishing reel with a gear assembly disposed on the side of the reel opposite the crank handle which has an easy opening housing and an interchangeable gear assembly to easily and quickly change gear ratios to thereby change retrieval speeds.

16 Claims, 23 Drawing Sheets

FISHING REEL TECHNOLOGY

37 C.F.R. §1.71(E) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever

CROSS-REFERENCE TO RELATED APPLICATIONS, IF ANY

This application claims the benefit under 35 U.S.C. §119 (e) of co-pending U.S. Provisional Patent Application Ser. No. 61/427,285, filed Dec. 27, 2010, which is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to fishing systems, apparatus and methods. Particularly, the invention relates to a fishing reel for use by sport fisherpersons.

2. Background Information

Existing technology in this field is believed to have significant limitations and shortcomings. One problem is that it is difficult to change retrieval speeds. Many fisher persons must carry several reels to alter retrieval speeds. This takes time, is difficult and is expensive. For this and other reasons, a need exists for the present invention.

All US patents and patent applications, and all other published documents mentioned anywhere in this application are incorporated by reference in their entirety.

BRIEF SUMMARY OF THE INVENTION

The invention provides an apparatus and method of using the apparatus which are practical, reliable, accurate and efficient, and which are believed to fulfill the need and to constitute an improvement over the background technology.

The invention provides a fishing reel with a gear assembly disposed on the side of the reel opposite the crank handle which has an easy opening housing and an interchangeable gear assembly to easily and quickly change gear ratios to thereby change retrieval speeds.

In an initial aspect, the invention provides reel including, a spool, a handle disposed on one side of the spool, and a gear assembly disposed on the opposite side of the spool, the gear assembly being communicatively connected to the handle and to the spool. Preferably, the spool has a central cylinder with a central lumen, a handle side flange, and a gear side flange. The reel further includes a spool shaft assembly disposed through the spool lumen. The spool shaft assembly preferably has a spool shaft and a drag sleeve. The reel still further preferably includes a handle shaft assembly communicatively connecting the handle to the gear assembly. The handle shaft assembly preferably has an outer crank shaft coupled to the gear assembly and a handle shaft coupled to the handle.

The gear assembly is manually adjustable to change reel retrieval speeds. The gear assembly is adjustable without the need to disconnect the handle from the reel. The gear assembly may have at least two manually interchangeable gears. Alternatively, or additionally, the gear assembly may have at least one reversible cluster gear which has a disk shaped configuration with two different gear teeth arrangements. The gear assembly further preferably includes an idler gear communicatively connected to the cluster gear or the interchangeable gear, and at least two drive tandem drive gears communicatively connected to the idler gear and to the spool.

The reel further preferably includes a housing which encloses the gear assembly, and which further has a quick release cover for access to the gear assembly.

In another aspect, the fishing reel with adjustable retrieval speeds, includes,
a. a spool, the spool having a central cylinder with a central lumen, a handle side flange, and a gear side flange;
b. a spool shaft assembly is disposed through the spool lumen of the spool;
c. a handle disposed on one side of the spool;
d. a gear assembly disposed on the opposite side of the spool, the gear assembly being communicatively connected to the handle and to the spool, the gear assembly being manually adjustable to change reel retrieval speeds without the need to disconnect the handle from the reel;
e. a handle shaft assembly communicatively connecting the handle to the gear assembly; and
f. a housing covering at least the gear assembly, the housing having a quick release cover for access to the gear assembly;

In another aspect, the invention provides a method of using a fishing reel comprising the steps of:
a. providing a fishing reel having a spool, a handle disposed on one side of the spool, and a gear assembly disposed on the opposite side of the spool, the gear assembly being communicatively connected to the handle and to the spool; and
b. accessing the gear assembly without removing the handle from the reel to adjust the retrieval speed of the reel.

The aspects, features, advantages, benefits and objects of the invention will become clear to those skilled in the art by reference to the following description, claims and drawings.

DETAILED DESCRIPTION

Figure 1:
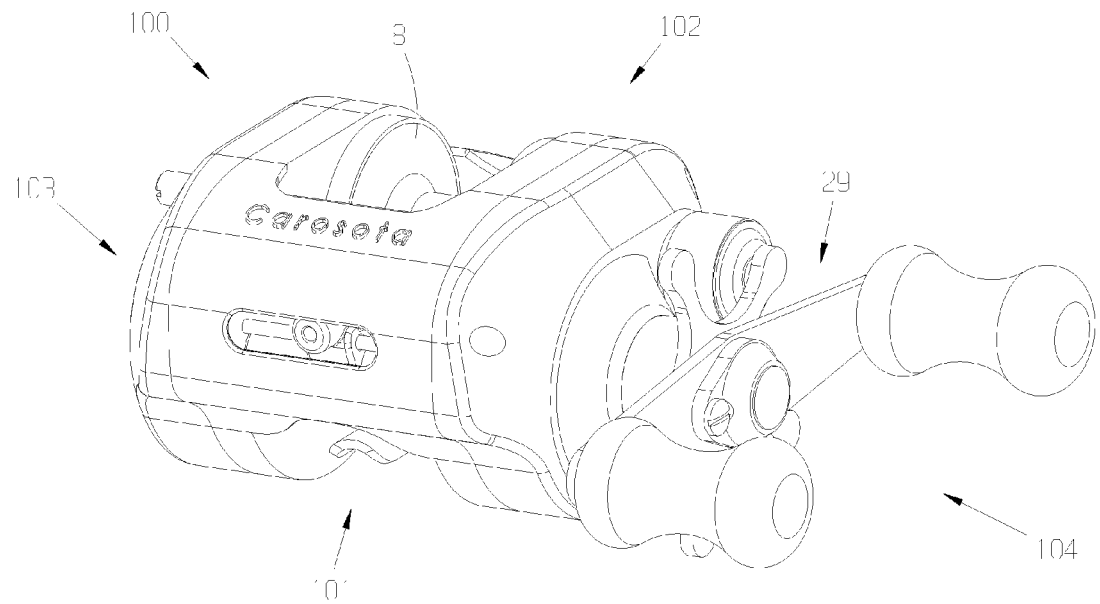
FIG. 1 is a perspective view of an embodiment of the reel of the present invention, showing the front or casting end thereof.
Figure 2:
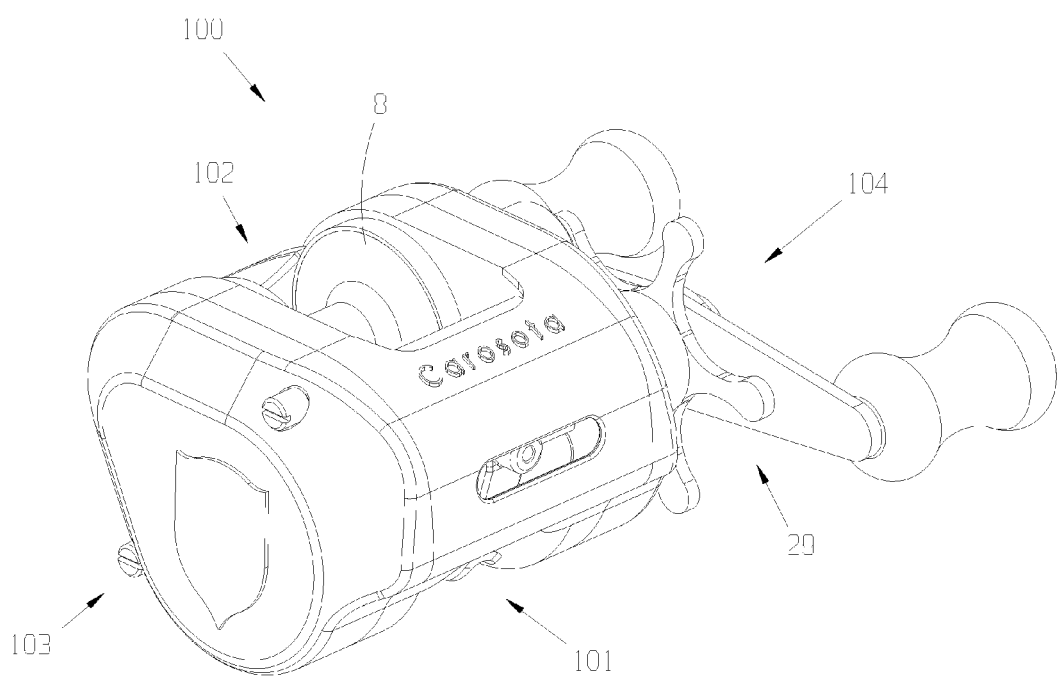
FIG. 2 is another front perspective view of the reel.
Figure 3:
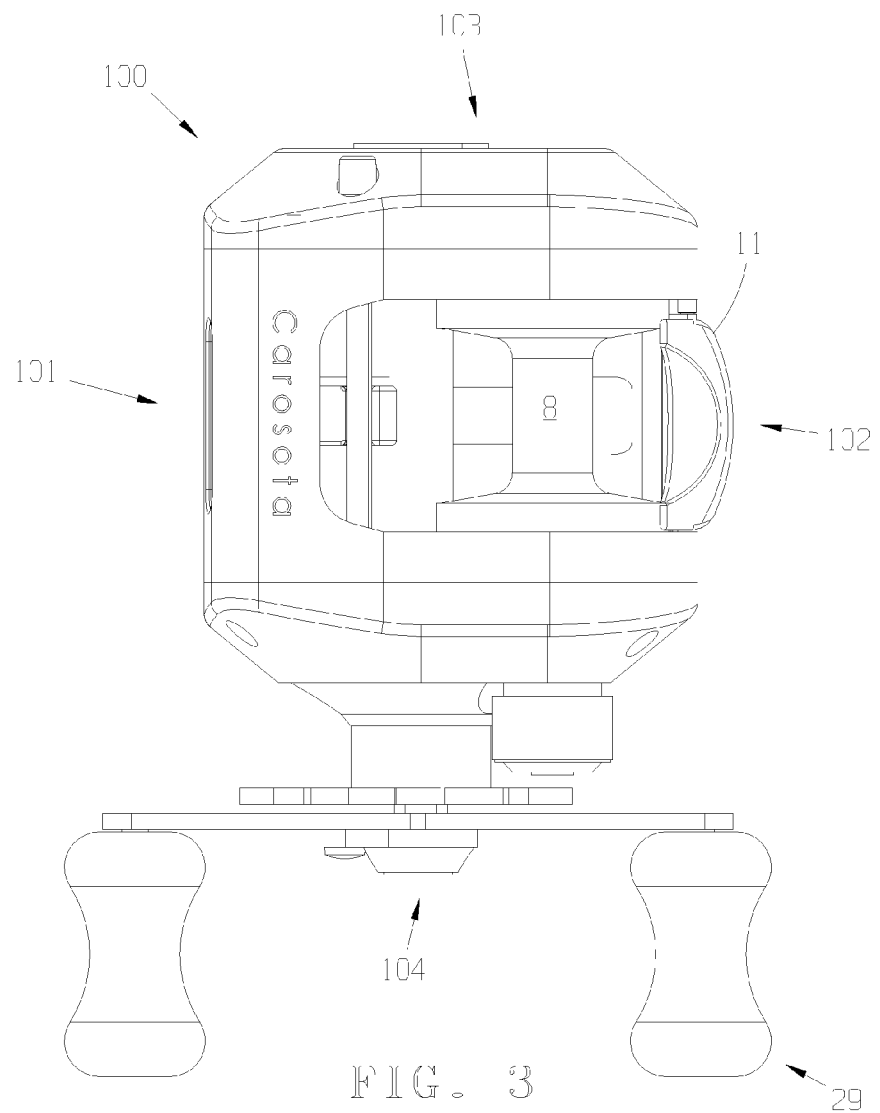
FIG. 3 is a top or plan view of the reel.
Figure 4:
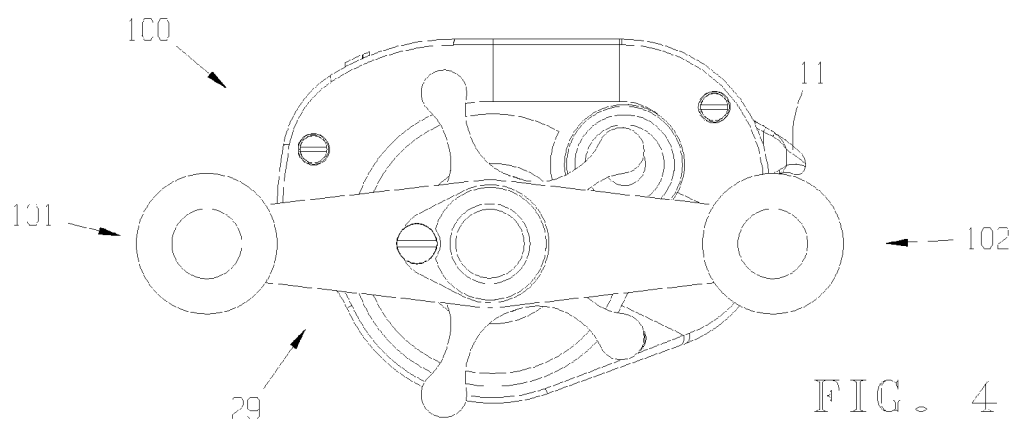
FIG. 4 is a side (left or handle) view of the reel.
Figure 5:
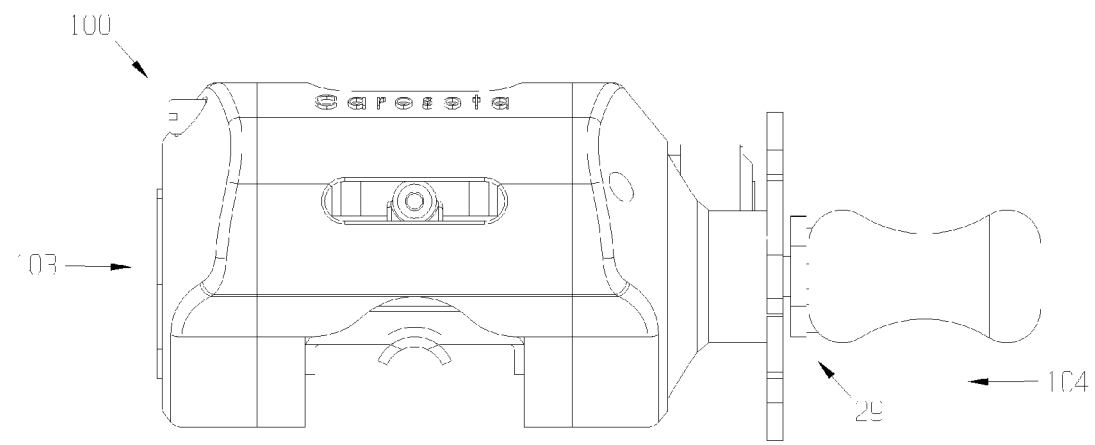
FIG. 5 is a front or casting end view of the reel.
Figure 6:
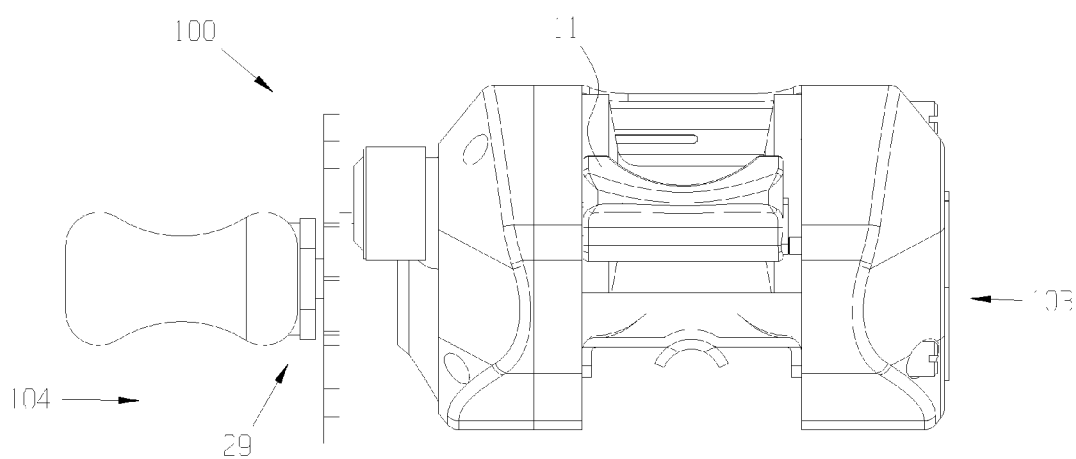
FIG. 6 is a back or user end view of the reel.
Figure 7:
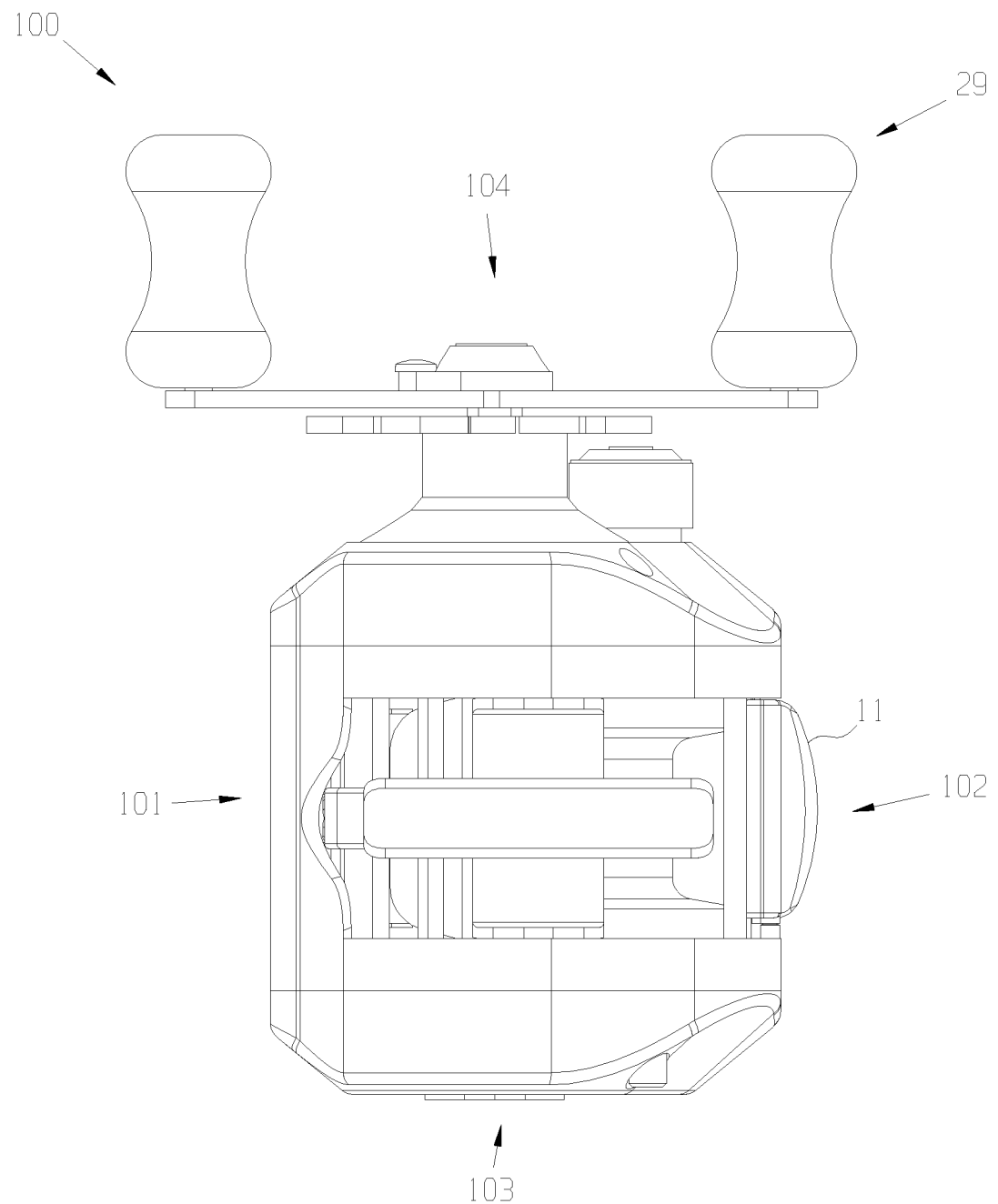
FIG. 7 is a bottom view of the reel.

FIGS. 1-7, show an embodiment of the fishing reel 100 of the present invention. The reel 100 has a front end 101 which faces outwardly from the user towards the casting direction, a rear or back end 102 which faces the user, a right (from the perspective of the user) or gear side 103 and a left or handle side 104. The reel 100 includes a housing 105 (See FIGS. 8-13) surrounding a spool 8. A handle assembly 104 is disposed on the left side 104. A thumb release 11 is disposed toward the back end 102.

Although the handle assembly 104 is shown and described as being on the left side in this embodiment (left hand version), it is within the purview of the invention that the features of the invention could be constructed and arranged in an opposing or mirror image fashion, whereby, for example, the handle assembly 104 would be on the right side (right hand version—not shown).

The fishing reel 100 has a gear assembly disposed on the side of the reel opposite the crank handle which has an easy opening housing and an interchangeable gear assembly to easily and quickly change gear ratios to thereby change retrieval speeds. Interchangeable and/or reversible gears permit plural gear ratios.

Referring also to FIGS. 8-29, the structure of a preferred embodiment of the apparatus 100 of the invention preferably comprises the elements listed in Table 1 below, preferably constructed and arranged as shown in the drawing Figures.

TABLE I

| Drawing No. | Element |
|---|---|
| 001 | Outer Cover - Handle Side |
| 002 | Inner Frame - Handle Side |
| 003 | Inner Frame - Gear Side |
| 004 | Front Shield |
| 005 | Reel Seat Assembly |
| 006 | Bushing - Gear Side (Bronze) |
| 007 | Bushing - Handle Side (Bronze) |
| 008 | Spool |
| 009 | Outer Cover - Gear Side |
| 010 | Line Guide |
| 011 | Thumb release |
| 012 | Sleeve - Handle Shaft |
| 013 | Handle Shaft Assembly |
| 014 | Worm Shaft |
| 015 | Level Wind Guard |
| 016 | Worm Bushing A |
| 017 | Gear - Level Wind |
| 018 | Anti-Reverse Ratchet |
| 019 | Drag Washer A |
| 020 | Anti-Reverse Pawl |
| 021 | Drive Gear - Blank |
| 022 | Drag Washer B |
| 023 | key Washer |
| 024 | Ball Bearing |
| 025 | Ball Bearing |
| 026 | Cast Control Cap |
| 027 | Roller Clutch Inner Tube |
| 028 | Star Drag |
| 029 | Handle Assembly |
| 030 | Handle Nut |
| 031 | Handle Nut Cover |
| 032 | Screw |
| 033 | Star Drag Nut |
| 034 | Star Drag Spring |
| 035 | Drag Spring Washer |
| 036 | Star Drag Spacer |
| 037 | Screw |
| 038 | Screw |
| 039 | Clutch Plate |
| 040 | Clutch Cam |
| 041 | Clutch Cam Retainer |
| 042 | Screw |
| 043 | Clutch Pawl |
| 044 | Torsion Spring |
| 045 | Yoke |
| 046 | Yoke Spring |
| 047 | Spool Shaft - Handle Side |
| 048 | Ball Bearing |
| 049 | Ball Bearing |
| 050 | Shaft, Cover Pivot |
| 051 | Spring |
| 052 | Cover Knob |
| 053 | Sleeve - Cover Pivot Shaft |
| 054 | Dowel |
| 055 | Spacer Rod A |
| 056 | Spacer Rod B |
| 057 | Rod, Thumb Release Pivot |
| 058 | Hex Nut |
| 059 | Spacer Rod C |
| 060 | Worm Bushing B |
| 061 | Washer |
| 062 | E-Ring A |
| 063 | E-Ring B |
| 064 | Thrust Washer |
| 065 | Reversible Cluster Gear Assembly: A = 4.8:1; B = 5.2:1 |
| 066 | Washer |

TABLE I-continued

| Drawing No. | Element |
| --- | --- |
| 067 | Interchangeable Gear: 6.2:1 |
| 068 | Gear (A, B, C and D) |
| 069 | Thrust Washer |
| 070 | Idler Gear |
| 071 | Idler Gear |
| 072 | Threaded Stud A |
| 073 | Threaded Stud B |
| 074 | Stud Post |
| 075 | Outer Crank Shaft |
| 076 | Gear |
| 077 | Thrust Washer |
| 078 | Ball Bearing |
| 079 | Gear Slip Shaft |
| 080 | Drag Sleeve - Anti-backlash Sleeve |

The reel 100 has a gear assembly 110 disposed on the side 103 opposite the crank handle 29 which is assessable to the user to change the retrieval speed by altering the gear ratio, without having to remove the crank handle assembly 104. The gears 110 are accessed via housing cover 9.

Figure 8:
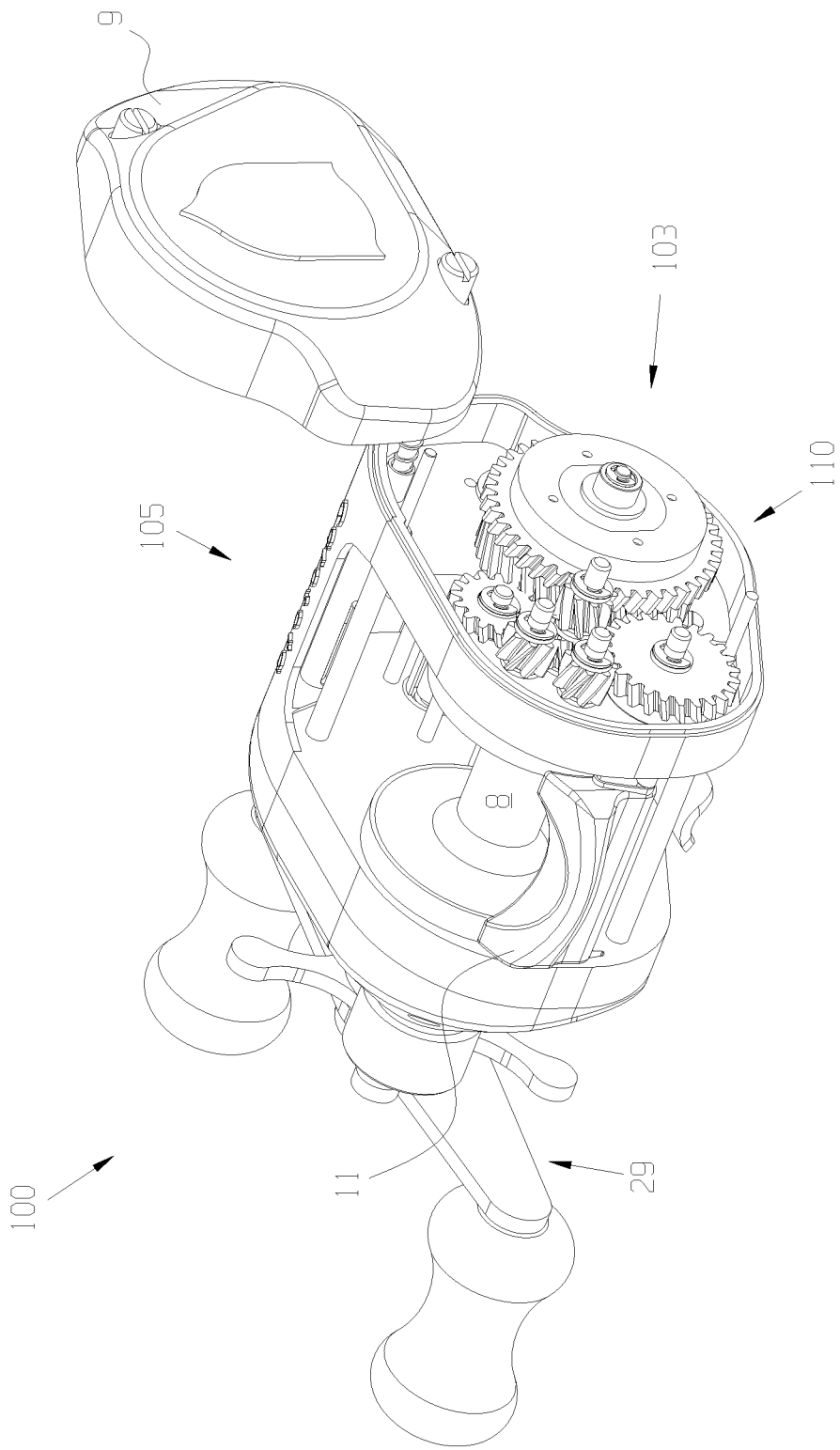
FIG. 8 is a perspective view showing the back or user end of the reel, and also showing the gear side of thereof, the housing being moved to show an embodiment of the gear assembly of the invention.
Figure 9:
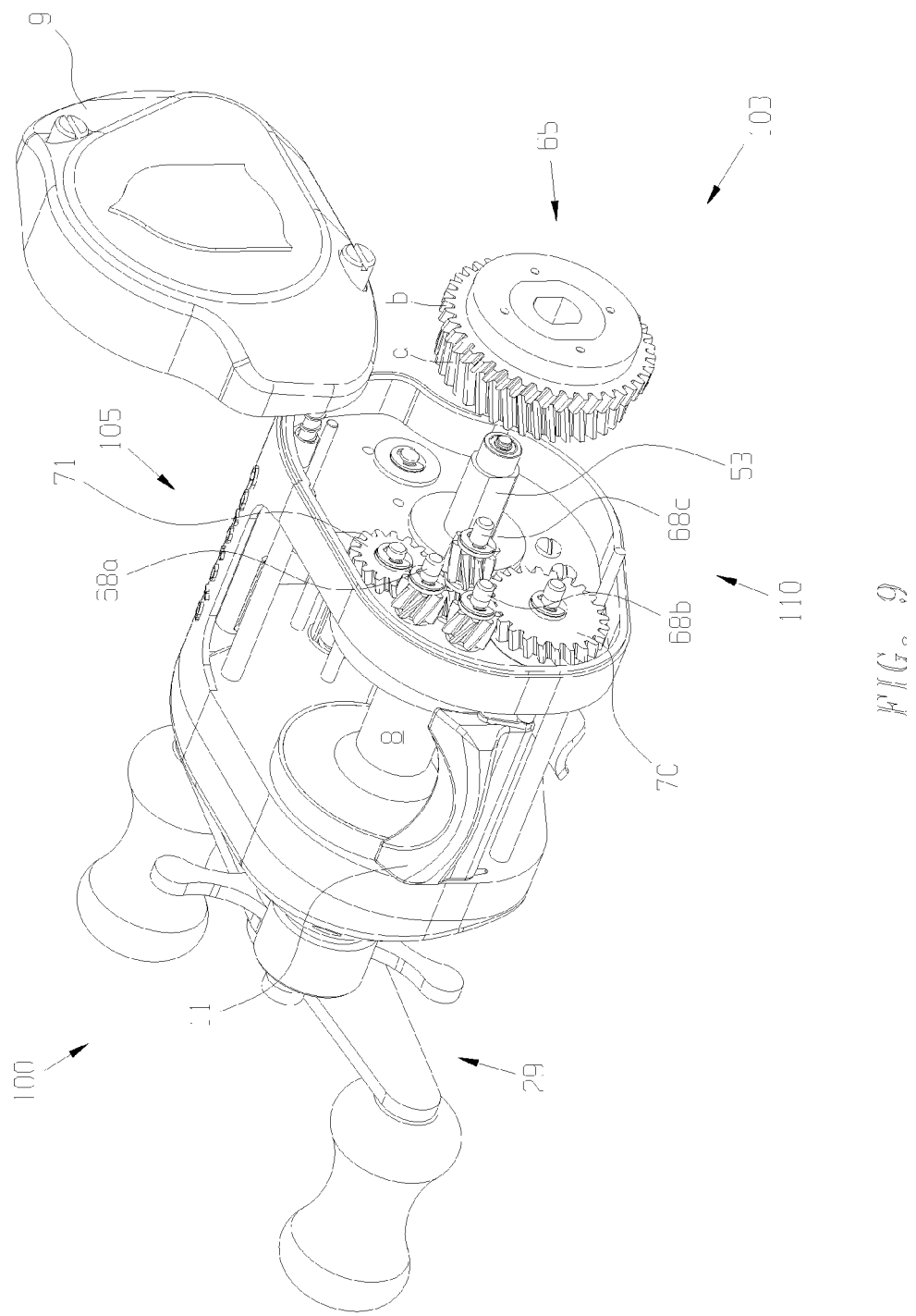
FIG. 9 is view similar to FIG. 8 showing an embodiment of an interchangeable and reversible gear element being removed for adjustment.
Figure 10:
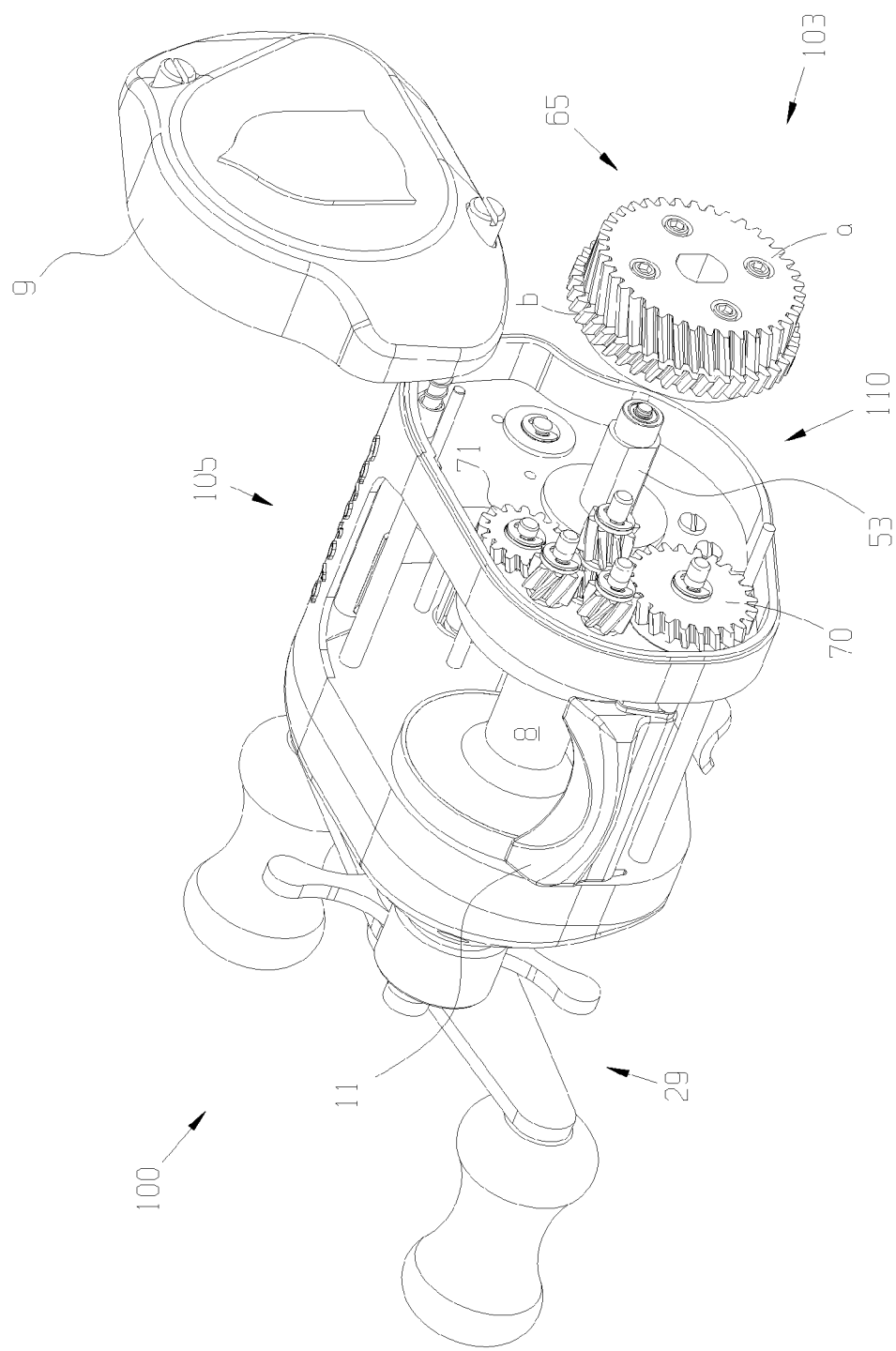
FIG. 10 is a view of the arrangement of FIGS. 9 and 10 showing the interchangeable gear element being reversed to adjust the gear ratio of the reel.
Figure 11:
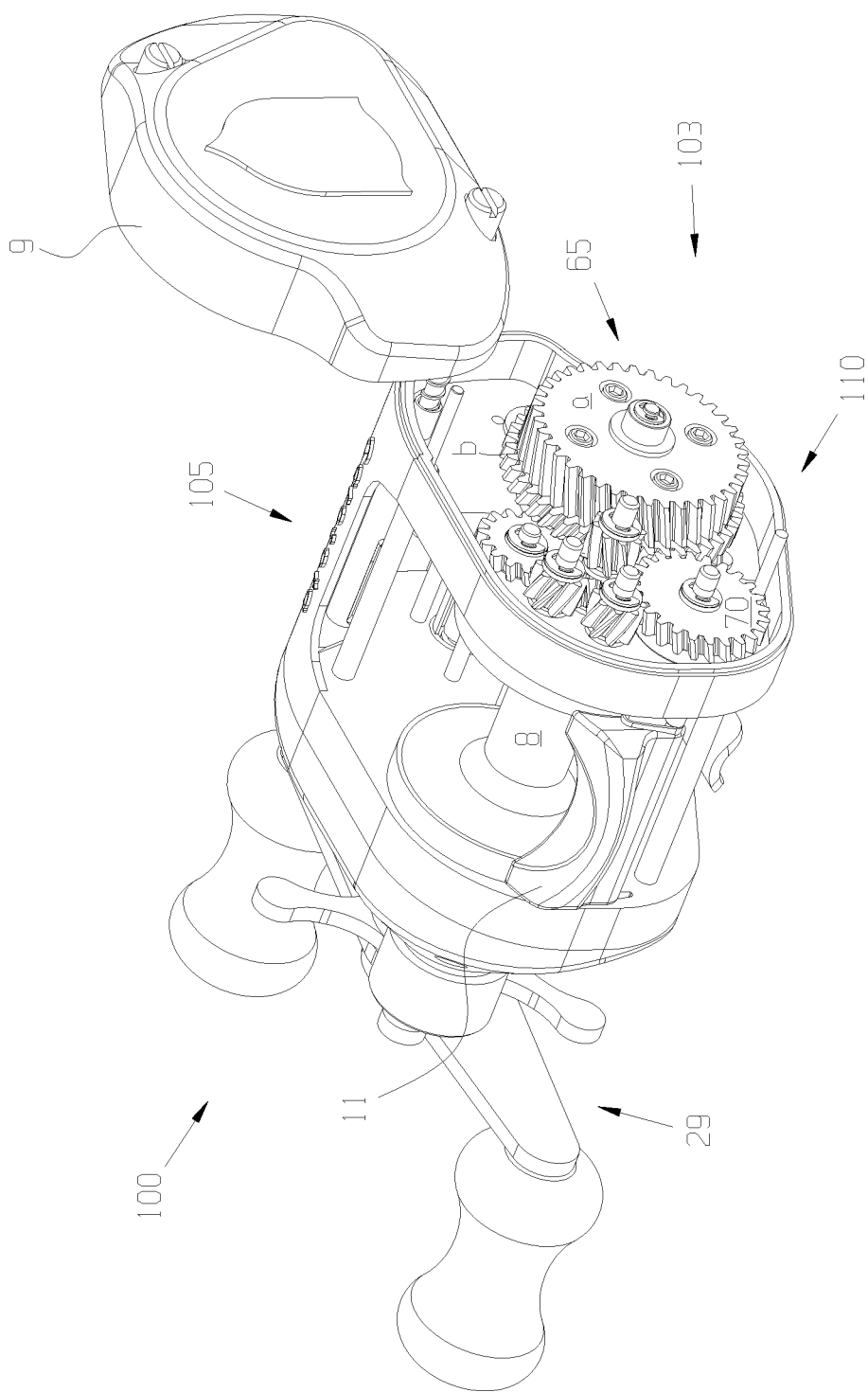
FIG. 11 is a view of the arrangement of FIG. 10 showing the gear element being re-inserted into the gear assembly.
Figure 12:
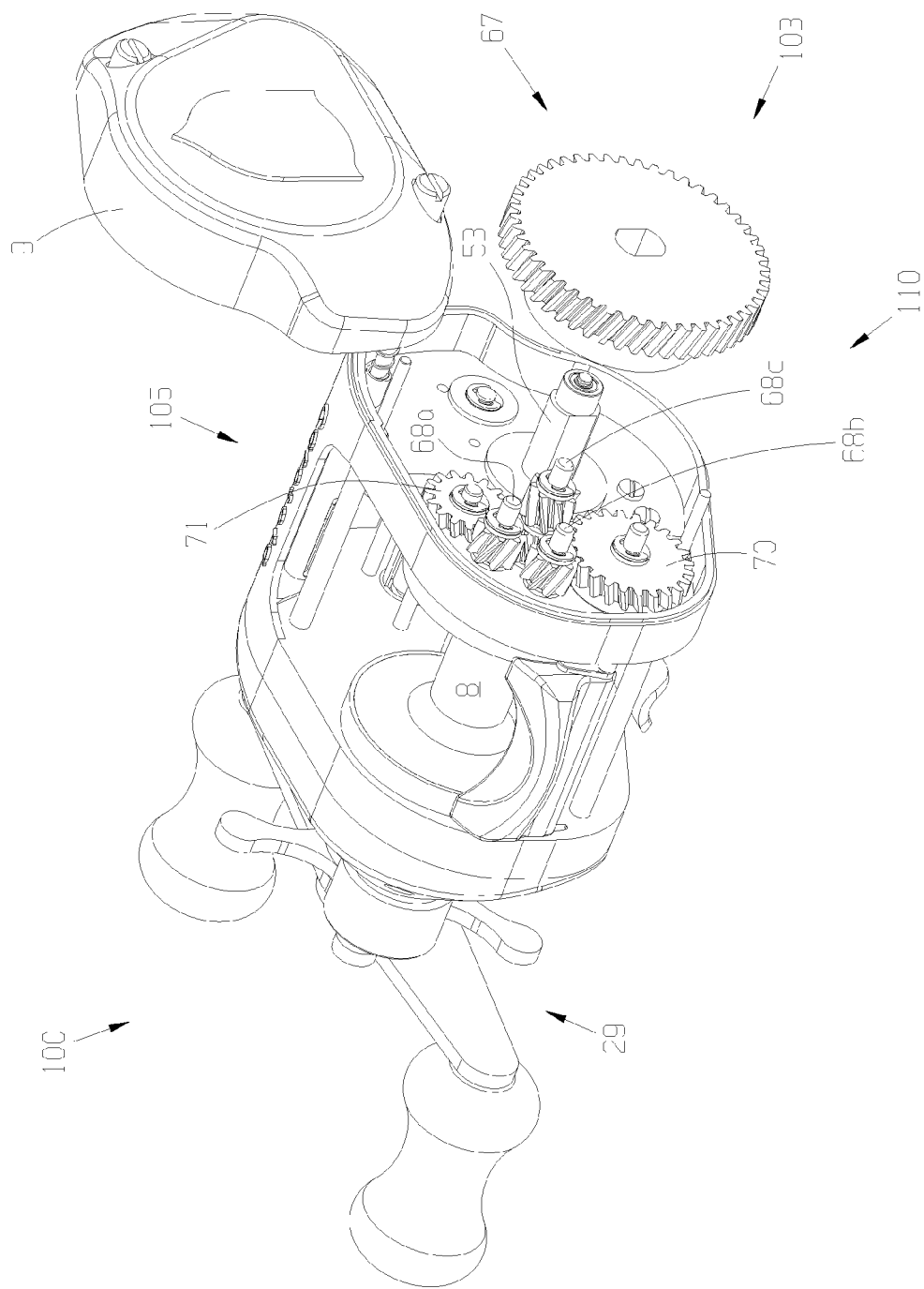
FIG. 12 is a perspective view, similar to FIG. 9 showing an alternative interchangeable gear element having a further different gear ratio.
Figure 13:
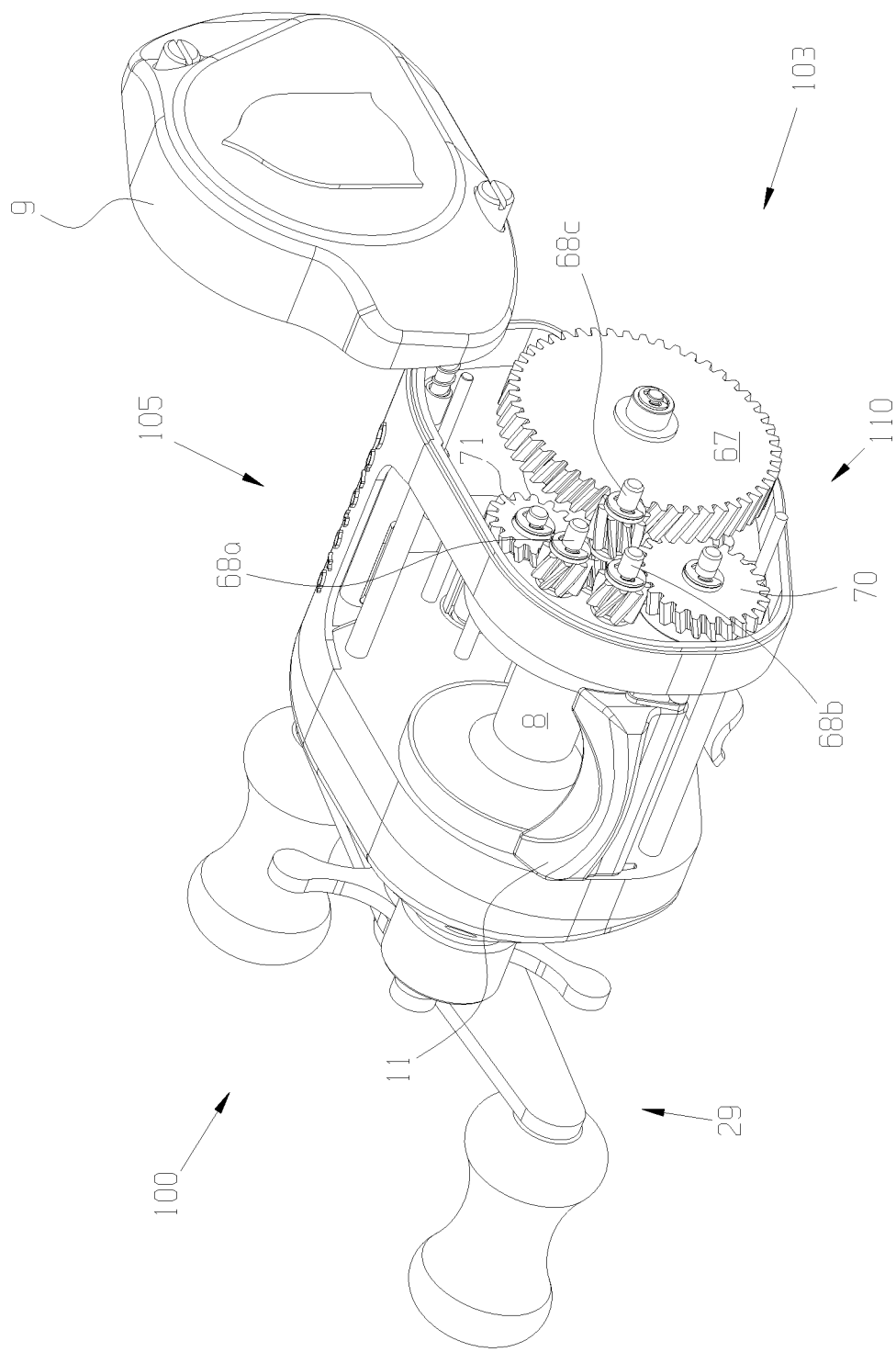
FIG. 13 is a perspective view of the assembly of FIG. 12 showing the gear element being re-inserted into the gear assembly.

As is best shown in FIGS. 8-16, the gear assembly 110 comprises idler gears 70 and 71, and tandem drive gears 68. Drive gears 68 are connected to the spool 8. The drive gears 68 are connected to the crank 29 via a removable gear connectable to outer crank shaft 75. Removable gear consists of cluster gear assembly 65 and gear 67. Cluster gear assembly 65 has two sided and is reversible to provide two different ratios. First side A is placed toward the reel 100 to provide a ratio of 4.8:1 as shown in FIGS. 8 and 9. Second side B is placed toward the reel 100 to provide a ratio of 5.2:1 as shown in FIGS. 10 and 11. Alternatively, gear 65 may be replaced with gear 67 to provide a ratio of 6.2:1 as shown in FIGS. 12 and 13. Other ratios may be achieved by changing the size and/or teeth arrangement of the removable gear. It is within the purview of the invention that further interchangeable single or cluster gears can be added or used with the reel 100 to yield further high or low gear ratios.

Figure 14:
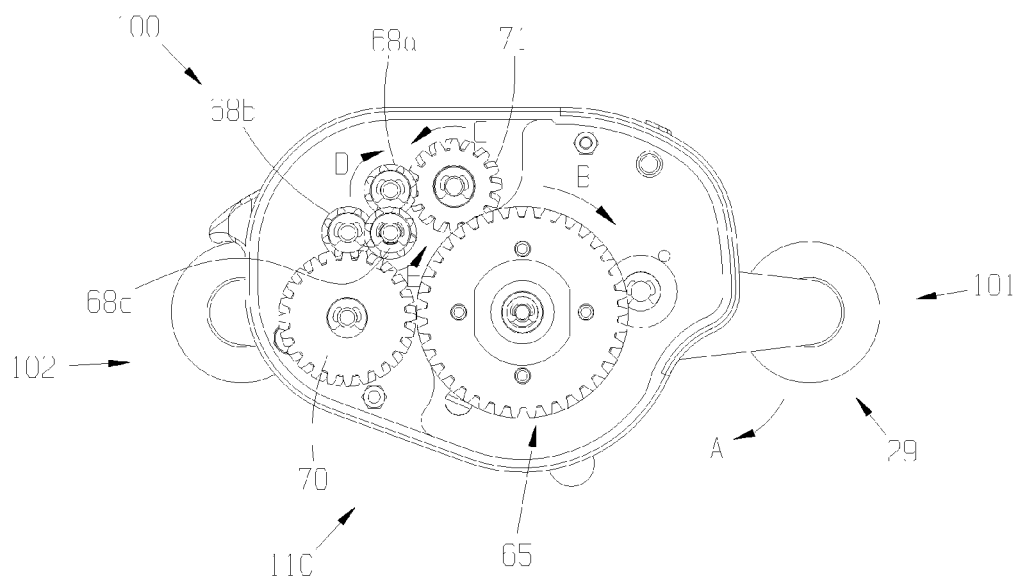
FIG. 14 is a right or gear side view of the reel showing the gear arrangement of FIGS. 8 and 9.
Figure 15:
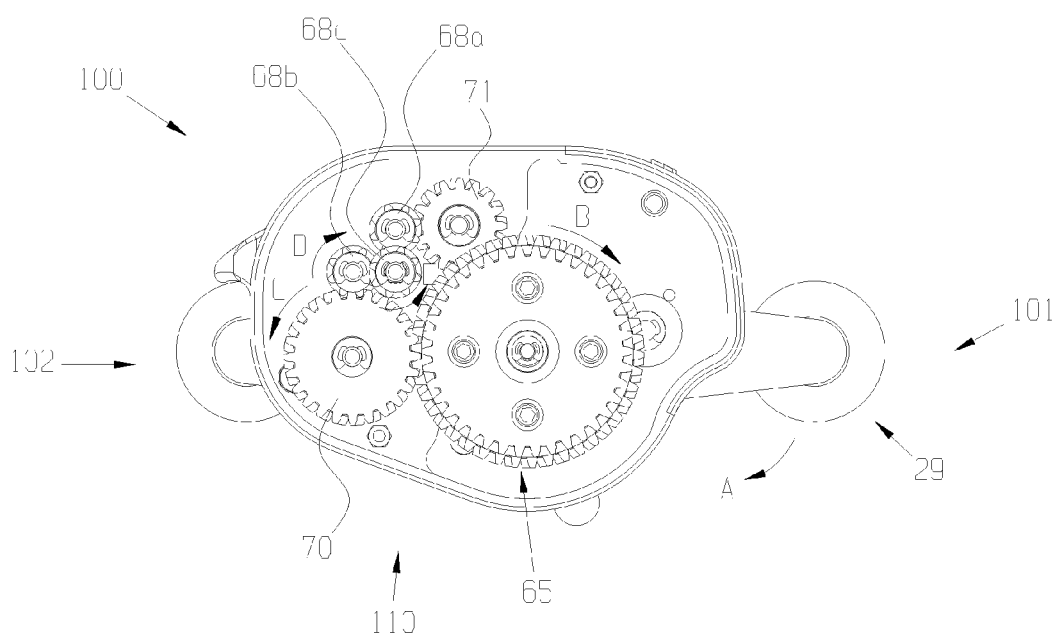
FIG. 15 is a gear side view of the reel showing the gear arrangement of FIGS. 10 and 11.
Figure 16:
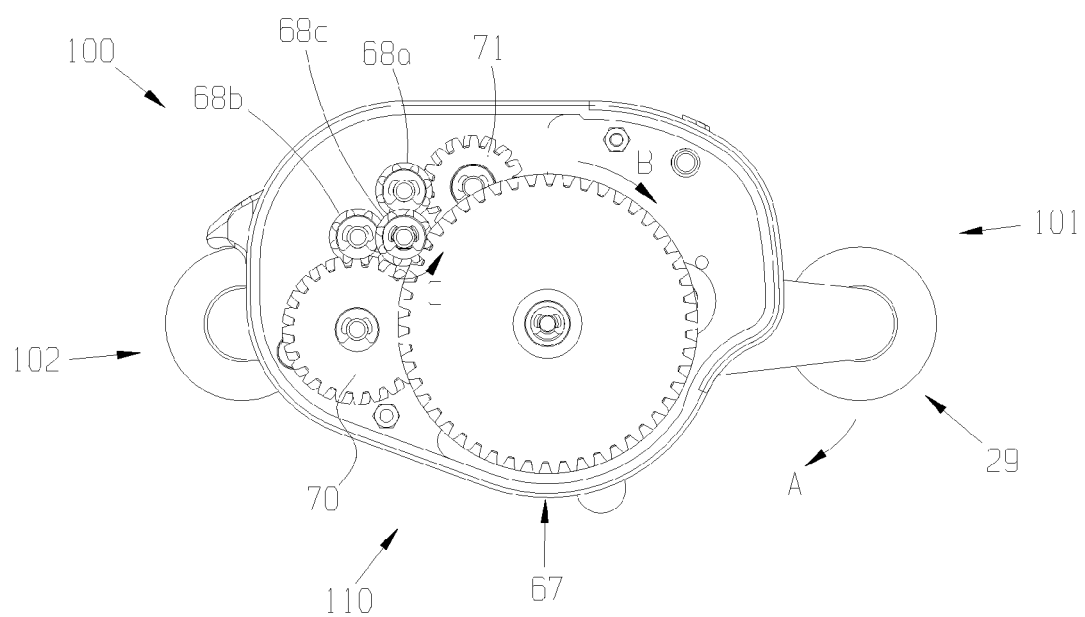
FIG. 16 is a gear side view of the reel having the gear arrangement of FIGS. 12 and 13.
Figure 17:
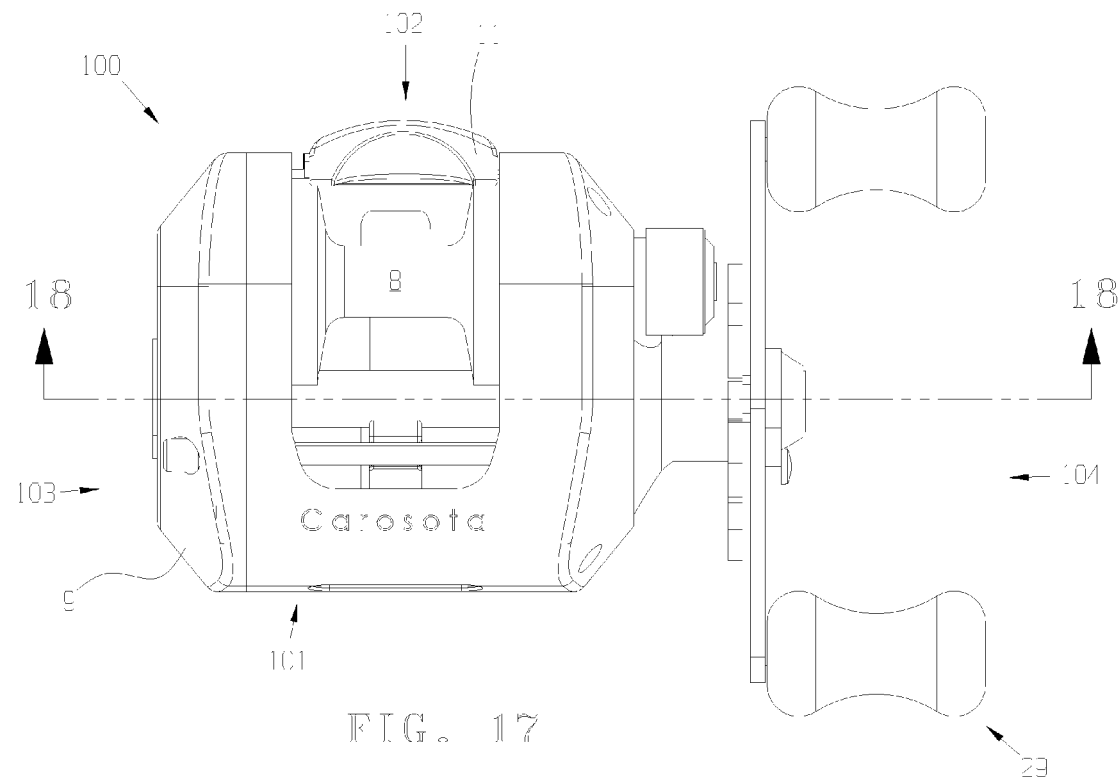
FIG. 17 is another top view of the reel.
Figure 18:
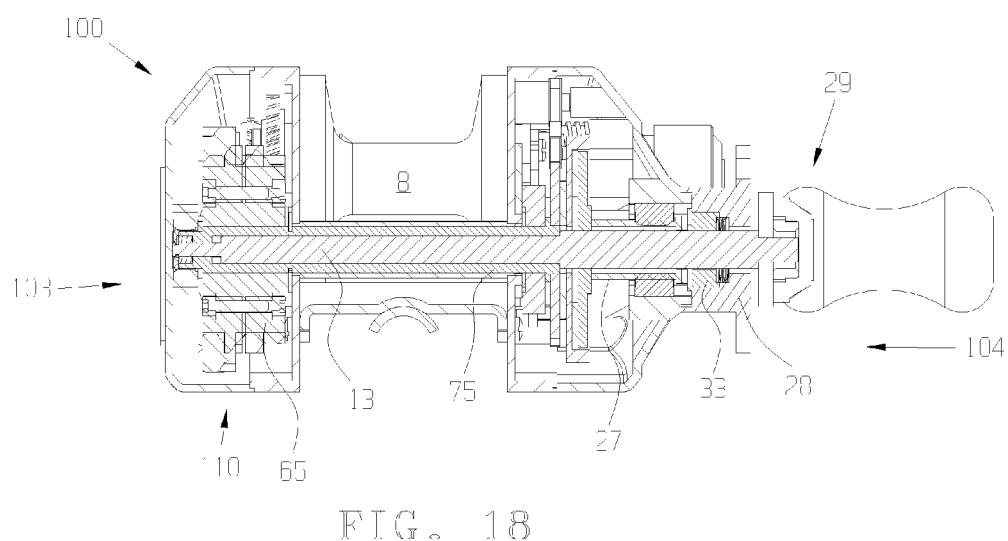
FIG. 18 is a crossectional view of the reel taken along line 18-18 of FIG. 17.
Figure 19:
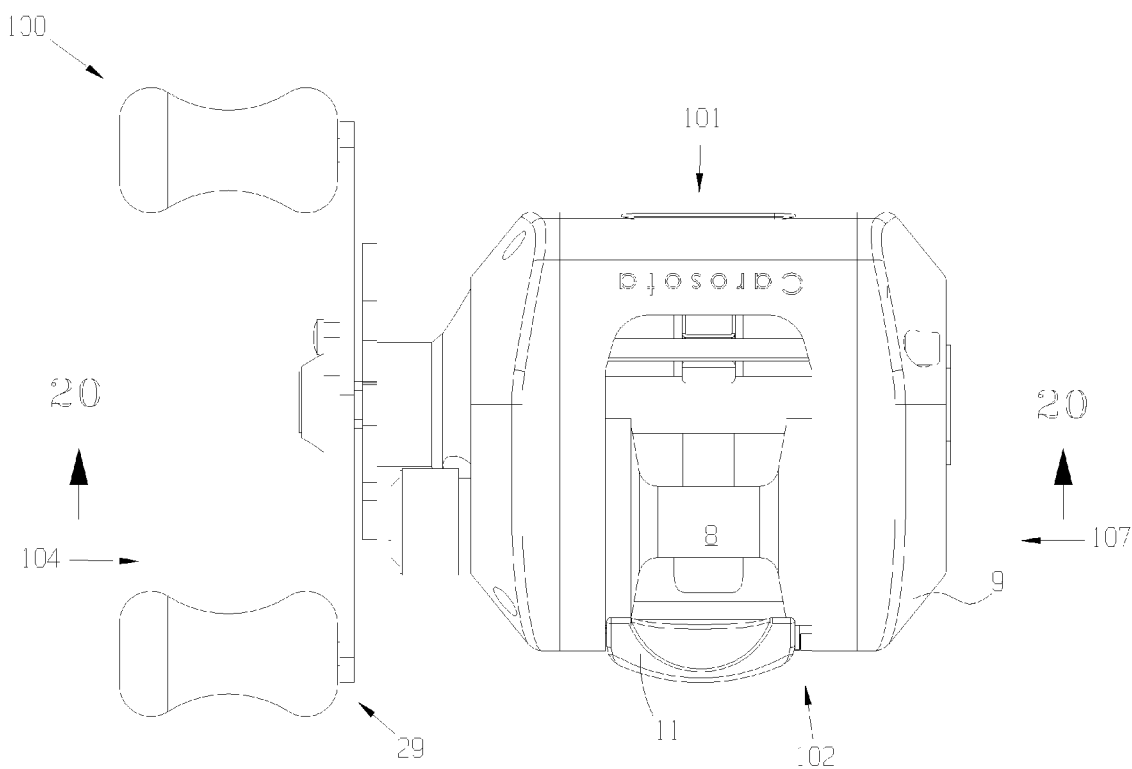
FIG. 19 is another top view of the reel.
Figure 20:
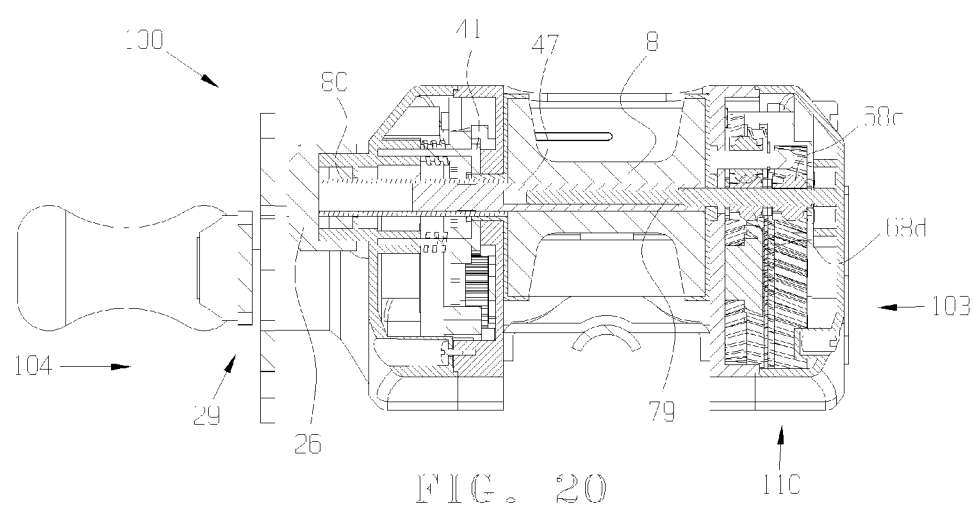
FIG. 20 is a crossectional view of the reel taken along line 20-20 of FIG. 19.
Figure 21:
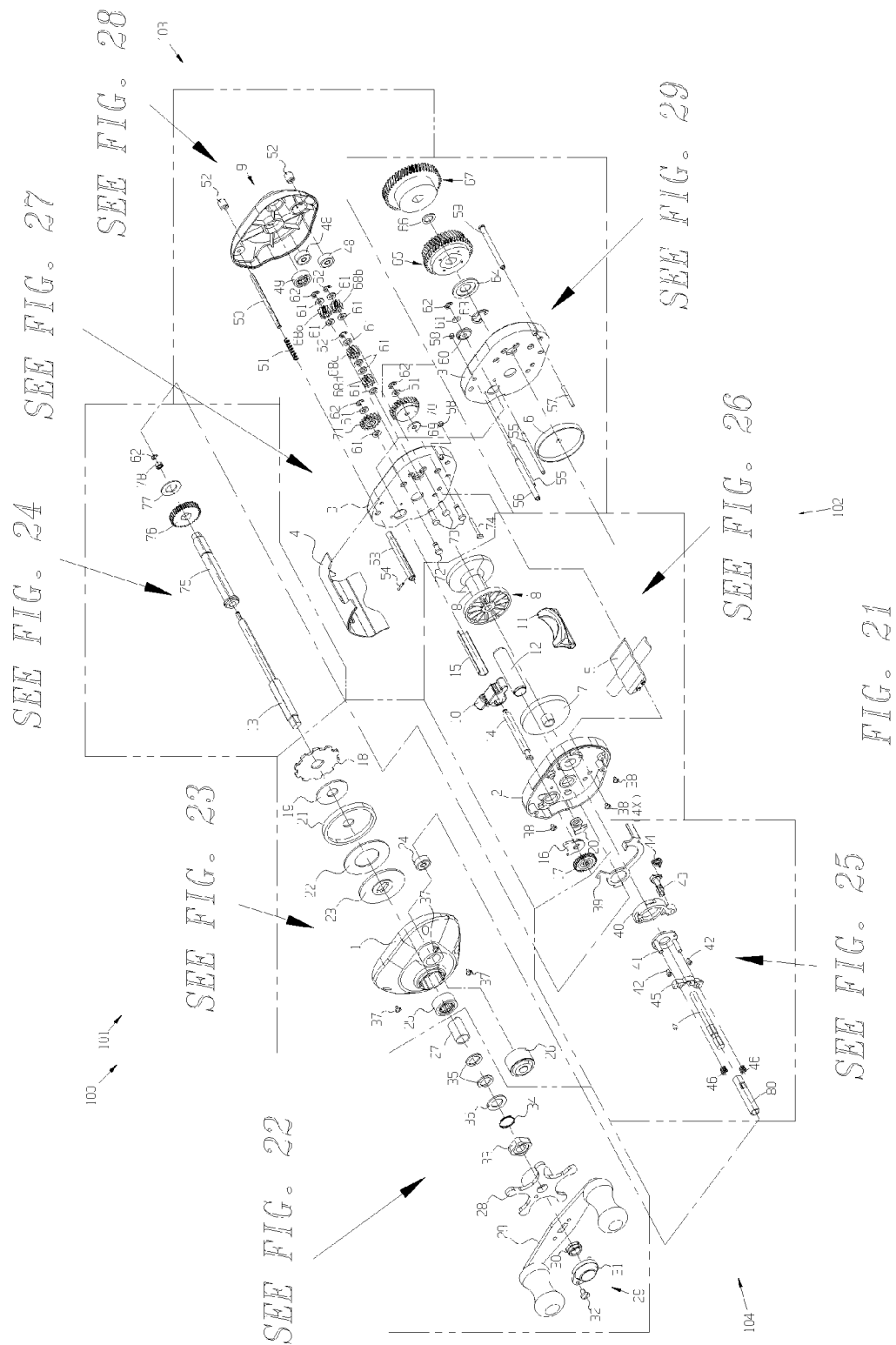
FIG. 21 is an exploded view of the reel.
Figure 22:
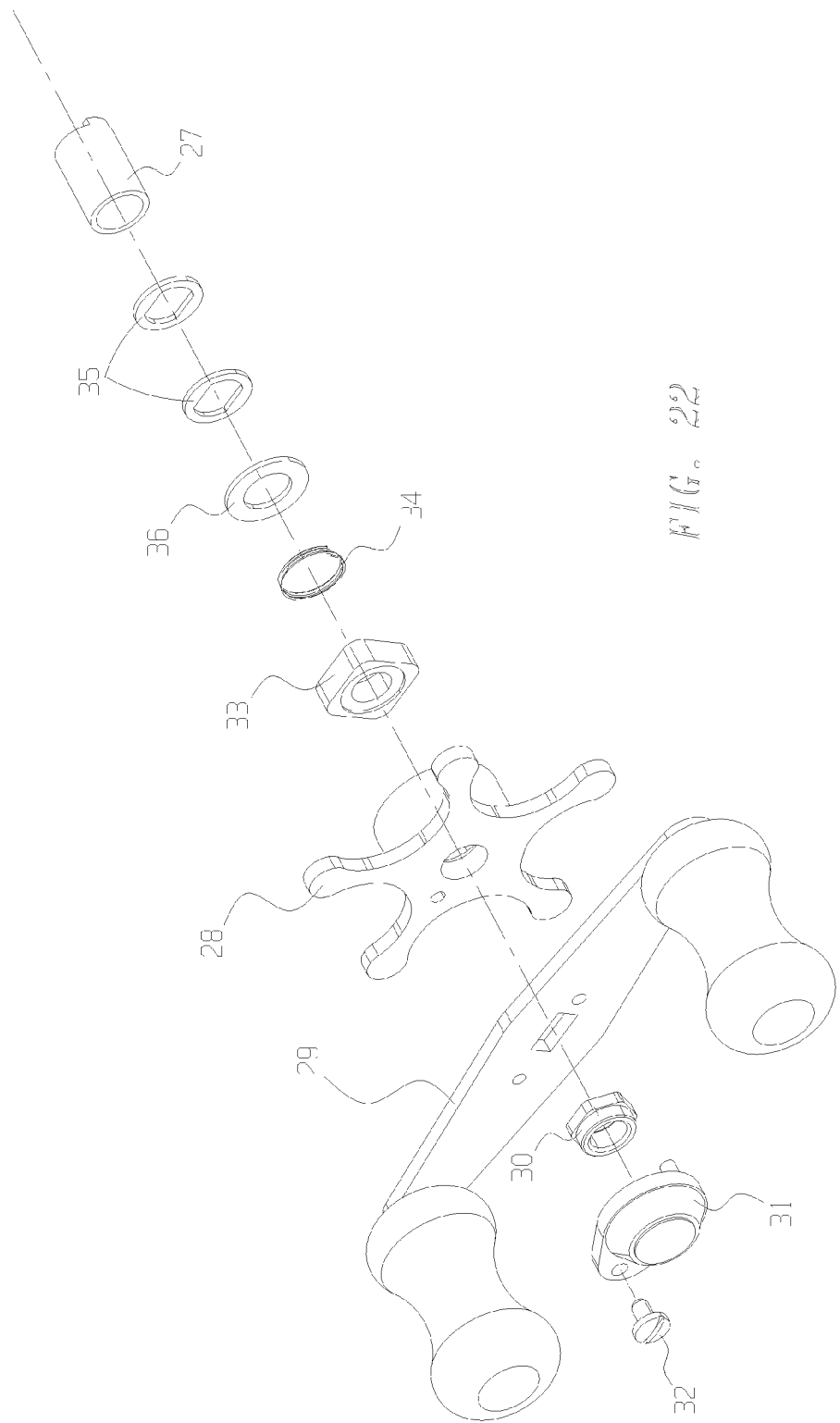
FIG. 22 is an exploded view showing details of the crank or handle assembly with respect to FIG. 21.
Figure 23:
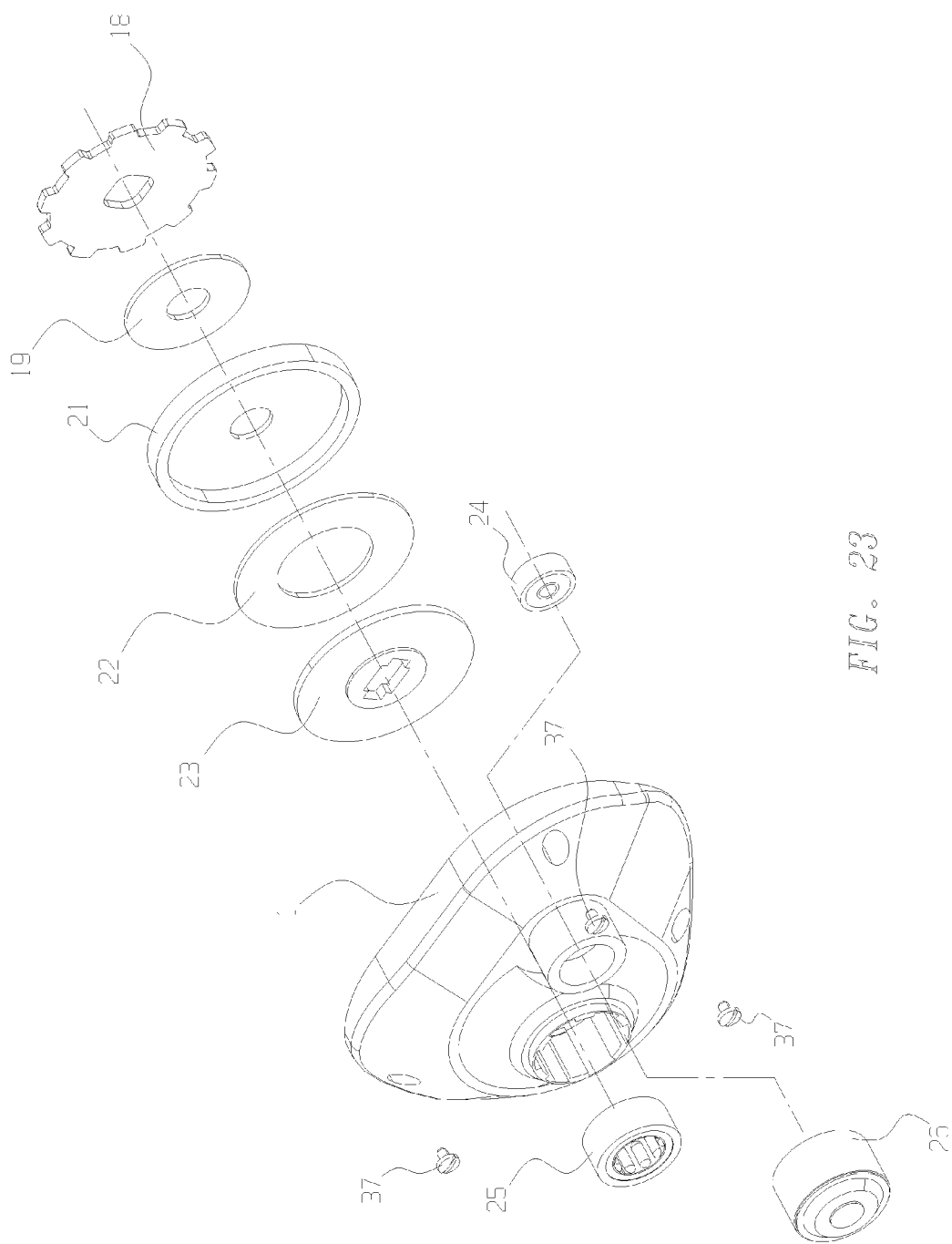
FIG. 23 is an exploded view showing details of the various components disposed on the left or handle side of the reel, with respect to FIG. 21.
Figure 24:
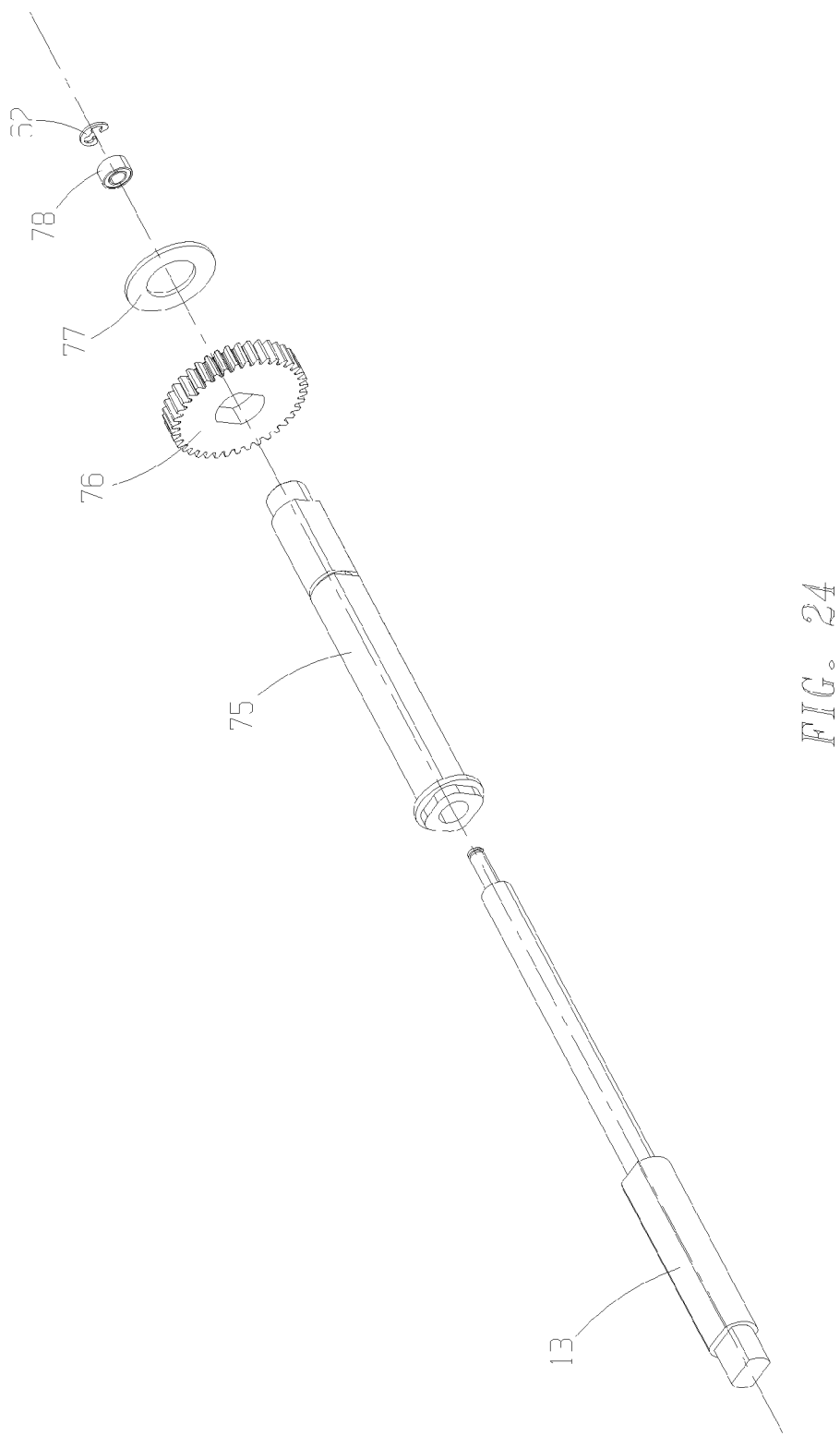
FIG. 24 is an exploded view showing details of the crank shaft and other components, with respect to FIG. 21.

In the preferred embodiment, the interconnection of gears in the gear assembly 110 for the low gear ratio (4.8:1) for slow retrieval speed is shown in FIG. 14 wherein crank 29 is rotated in direction A, which rotates replaceable/reversible gear 65 in direction B, which moves idler gear 71 in direction C, which moves gear 68a in direction D, which moves gear 68c in direction E. Gear 68c is connected to the spool 8. The interconnection of gears in the gear assembly 110 for the intermediate gear ratio (5.2:1) for medium retrieval speed is shown in FIG. 15 wherein crank 29 is rotated in direction A, which rotates replaceable/reversible gear 65 in direction B, which moves idler gear 70 in direction C, which moves gear 68b in direction D, which moves gear 68c in direction E. The interconnection of gears in the gear assembly 110 for the high gear ratio (6.2:1) for fast retrieval speed is shown in FIG. 16 wherein crank 29 is rotated in direction A, which rotates replaceable gear 67 in direction B, which moves gear 68c in direction C.

Figure 25:
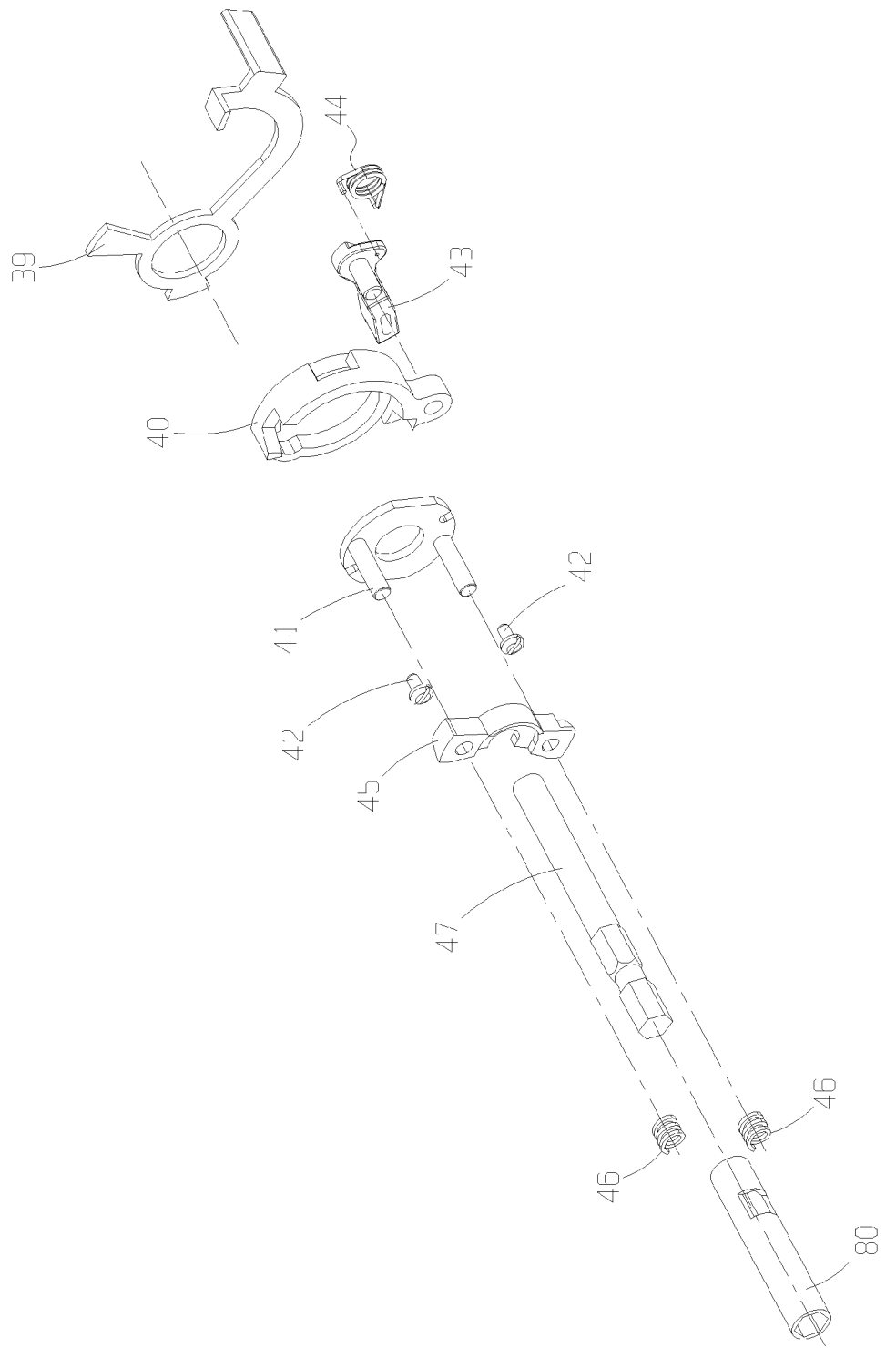
FIG. 25 is an exploded view showing details of the clutch and other components, with respect to FIG. 21.
Figure 26:
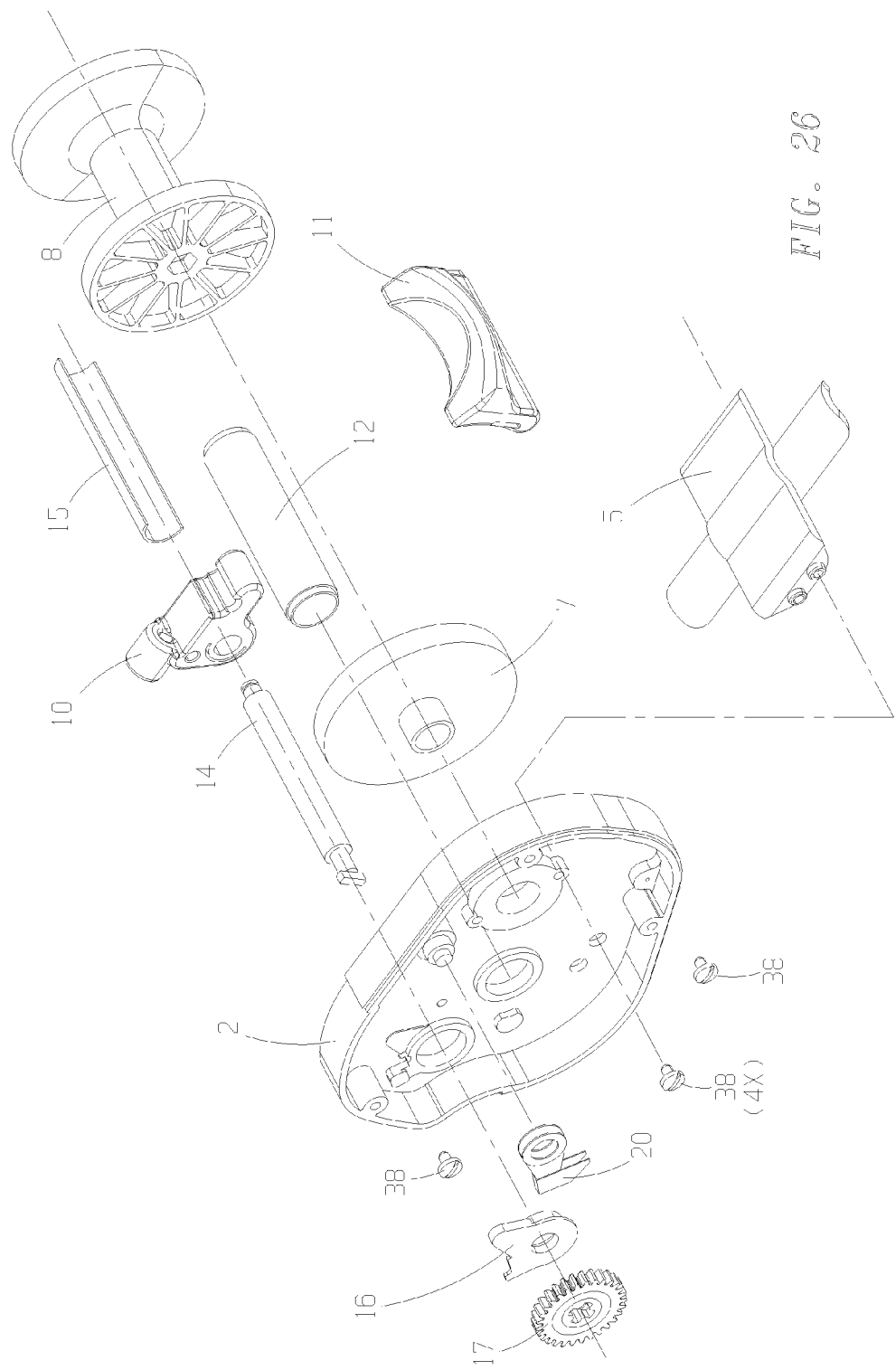
FIG. 26 is an exploded view showing details of the spool and other components, with respect to FIG. 21.
Figure 27:
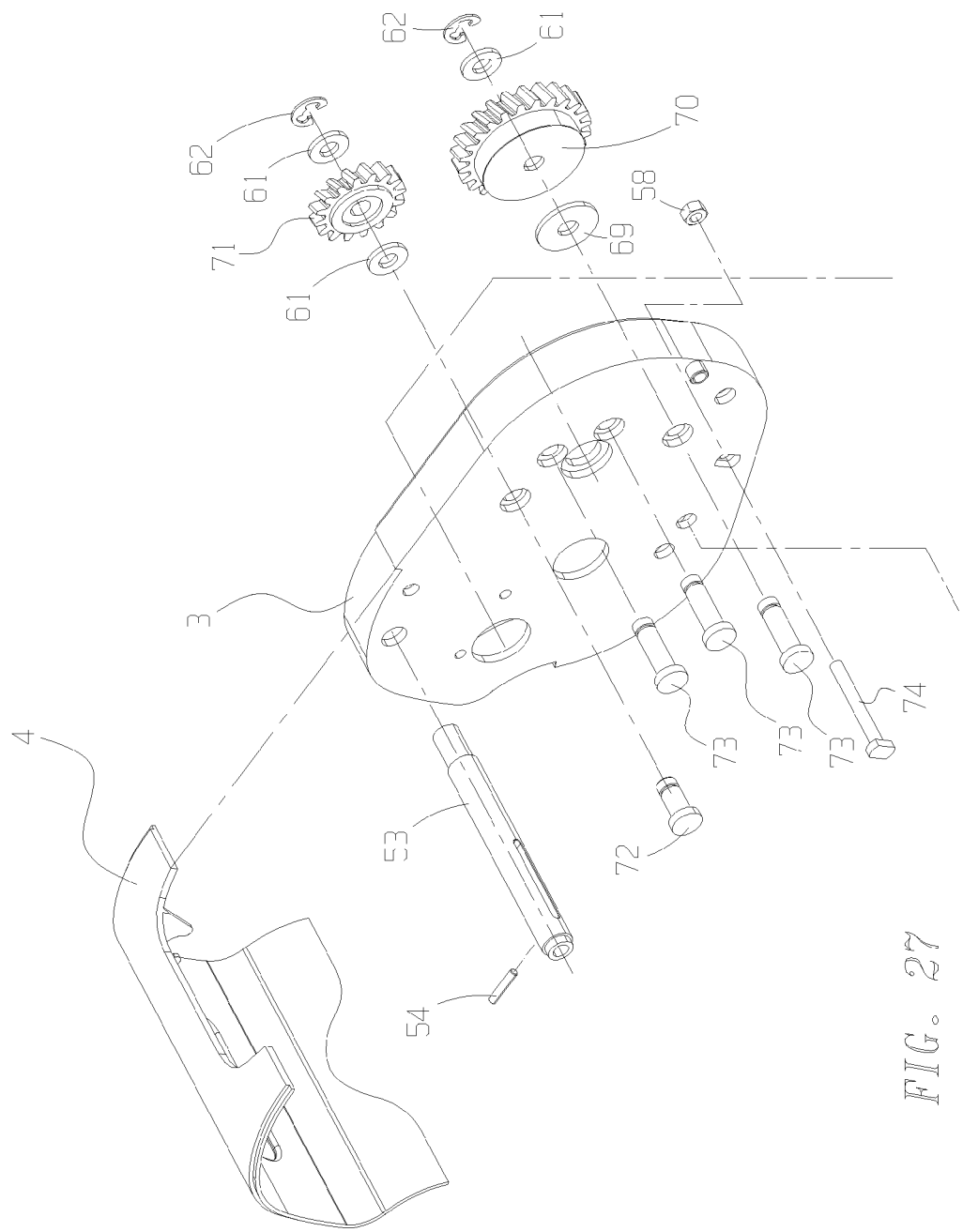
FIG. 27 is an exploded view showing details of various components disposed on the right or gear side of the reel, with respect to FIG. 21.
Figure 28:
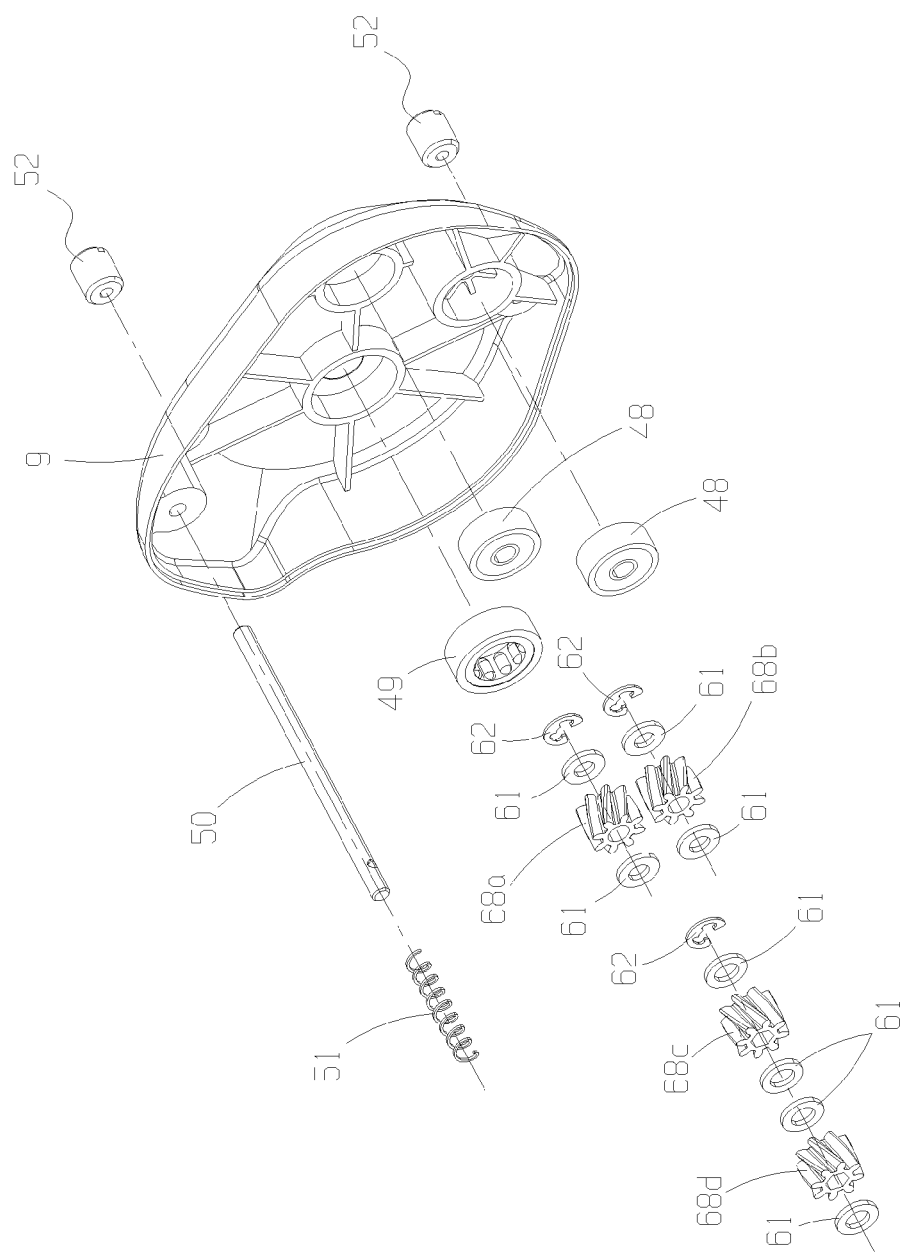
FIG. 28 is an exploded view showing details of the gear assembly, with respect to FIG. 21.
Figure 29:
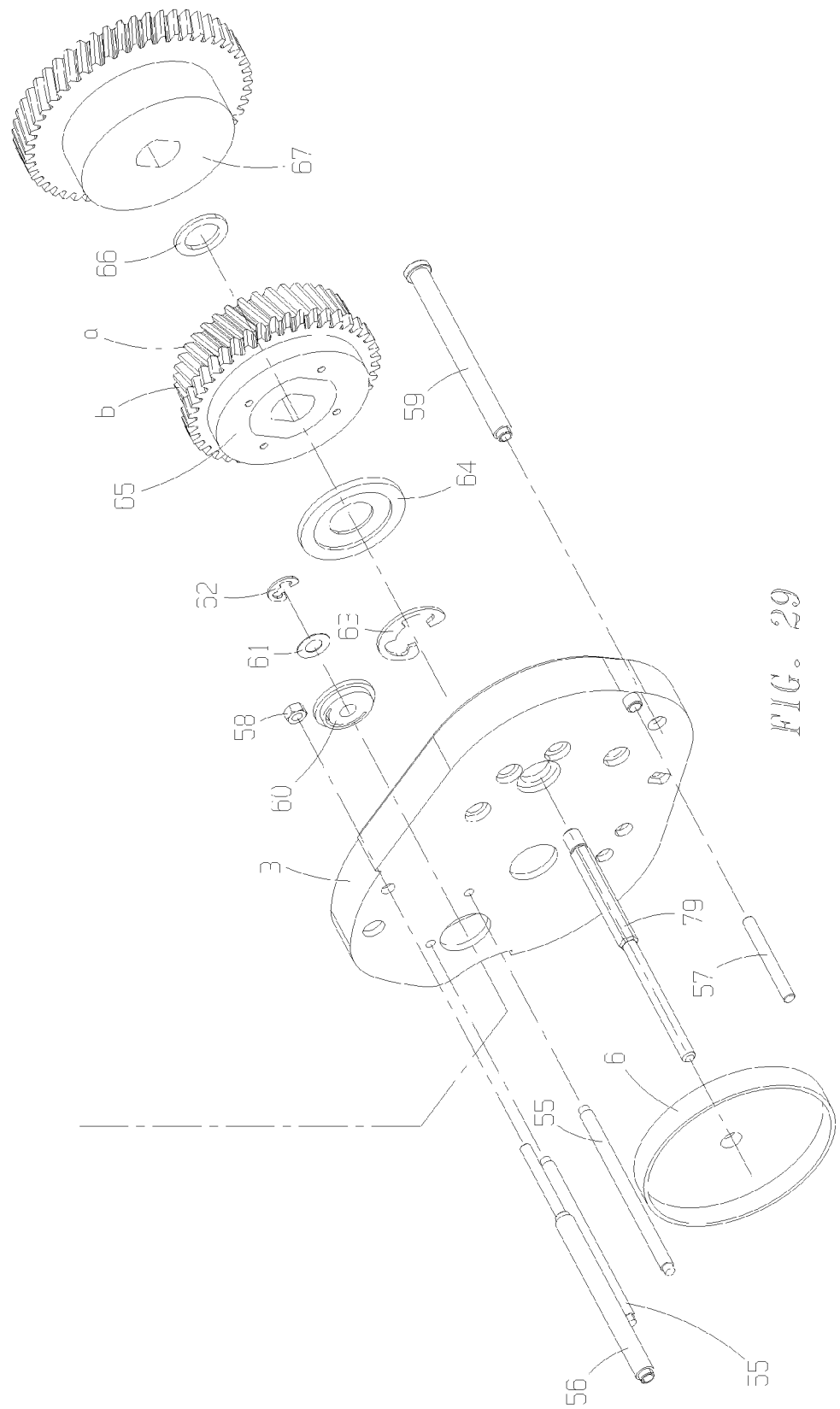
FIG. 29 is an exploded view showing further details of gear assembly and other components disposed on the right side of the reel, with respect to FIG. 21.

The shaft assembly going through the spool 8 functions as a slip shaft. The slip shaft allows the gearing to disengage and to permit "free spooling" action whereby the spool spins without any drag from the gears meshing. As is best shown in FIG. 25, drag sleeve 80 applies pressure to the spool 8 which controls backlash during casting. Anti-backlash functionality and drag (for fish fighting) functionality work independently in the reel 100.

In a preferred method or sequence of use, during casting, thumb release 11 is pressed by the user to rotate the clutch plate 39. This in turn rotates the clutch cam 40, causing yoke 45 to rise up disengaging the handle-side spool shaft 47 from spool 8 and gear-side spool shaft 79 which then allows spool 8 to completely free spin. To retrieve, the handle 104 is turned, which causes the spool shaft 47 to engage the spool 8 and the gear shaft 79.

The benefits of the invention include being able to use a single reel to retrieve a fishing lure at different speeds, and being able to make speed changes easily, and without removing the crank 29.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. A reel comprising, a spool, a handle disposed on one side of the spool, and a gear assembly disposed on the opposite side of the spool, the gear assembly being communicatively connected to the handle and to the spool, the reel further comprising a handle shaft assembly communicatively connecting the handle to the gear assembly, and wherein the gear assembly is manually adjustable to change reel retrieval speeds, wherein the gear assembly is adjustable without the need to disconnect the handle from the reel, and wherein the ear assembly has at least one reversible cluster gear which has a disk shaped configuration with two different gear teeth arrangements.

2. The reel of claim 1, wherein the spool has a central cylinder with a central lumen, a handle side flange, and a gear side flange.

3. The reel of claim 2, further comprising a spool shaft assembly is disposed through the spool lumen.

4. The reel of claim 3, wherein the spool shaft assembly comprises a spool shaft and a drag sleeve.

5. The reel of claim 3, further comprising a manually operable clutch mechanism for actuating the spool to free spin.

6. The reel of claim 1 wherein the handle shaft assembly comprises an outer crank shaft coupled to the gear assembly and a handle shaft coupled to the handle.

7. The reel of claim 1 wherein the handle has a pair of arms.

8. The reel of claim 1, wherein the gear assembly has at least two manually interchangeable gears.

9. The reel of claim 1 wherein the gear assembly is adjustable between approximately 4.8:1 and 6.2:1.

10. The reel of claim 9, wherein the gear assembly comprises at least three manually selectable speeds, the gear assembly comprising at least one reversible cluster gear that permits manual selection of two gear teeth configurations and at least one separate, interchangeable gear that permit manual selection of at least one further gear teeth configuration by exchange with the at least one reversible cluster gear.

11. The reel of claim 10, wherein the gear assembly further comprises an idler gear communicatively connected to the cluster gear or the interchangeable gear, and at least two drive tandem drive gears communicatively connected to the idler gear and to the spool.

12. The reel of claim 11, wherein there are two idler gears and four tandem drive gears.

13. The reel of claim 1, further comprising a housing which encloses the gear assembly.

14. The reel of claim 13, wherein the housing has a quick release cover for access to the gear assembly.

15. A method of using a fishing reel comprising the steps of:
 a. providing a fishing reel having:
   (i) a spool;
   (ii) a handle disposed on one side of the spool;
   (iii) a gear assembly disposed on the opposite side of the spool, the gear assembly being communicatively connected to the handle and to the spool;
   (iv) the reel further comprising a handle shaft assembly communicatively connecting the handle to the gear assembly, and wherein the gear assembly is manually adjustable to change reel retrieval speeds; and
   (v) wherein the gear assembly has at least one reversible cluster gear which has a disk shaped configuration with two different gear teeth arrangements;
 b. accessing the gear assembly without removing the handle from the reel to adjust the retrieval speed of the reel.

16. A reel comprising, a spool, a handle disposed on one side of the spool, and a gear assembly disposed on the opposite side of the spool, the gear assembly being communicatively connected to the handle and to the spool, the reel further comprising a handle shaft assembly communicatively connecting the handle to the gear assembly, and wherein the gear assembly is manually adjustable to change reel retrieval speeds, wherein the gear assembly is adjustable without the need to disconnect the handle from the reel, wherein the gear assembly is adjustable between approximately 4.8:1 and 6.2:1 and wherein the gear assembly comprises at least three manually selectable speeds, the gear assembly comprising at least one reversible cluster gear that permits manual selection of two gear teeth configurations and at least one separate, interchangeable gear that permit manual selection of at least one further gear teeth configuration by exchange with the at least one reversible cluster gear.

* * * * *